US008586654B2

(12) United States Patent
Zhao et al.

(10) Patent No.: US 8,586,654 B2
(45) Date of Patent: Nov. 19, 2013

(54) ANISOTROPIC COMPOSITE

(75) Inventors: Wenji K. Zhao, Shanghai (CN); Ludovic Valette, Lake Jackson, TX (US)

(73) Assignee: DOW Global Technologies, LLC, Midland, MI (US)

( * ) Notice: Subject to any disclaimer, the term of this patent is extended or adjusted under 35 U.S.C. 154(b) by 0 days.

(21) Appl. No.: 13/264,915

(22) PCT Filed: Apr. 21, 2009

(86) PCT No.: PCT/CN2009/000423
§ 371 (c)(1),
(2), (4) Date: Oct. 17, 2011

(87) PCT Pub. No.: WO2010/121393
PCT Pub. Date: Oct. 28, 2010

(65) Prior Publication Data
US 2012/0046391 A1 Feb. 23, 2012
US 2012/0196955 A9 Aug. 2, 2012

(51) Int. Cl.
*C08L 63/00* (2006.01)
*C08K 3/04* (2006.01)
*C08K 3/34* (2006.01)

(52) U.S. Cl.
USPC ............ 523/440; 524/186; 524/284; 524/496

(58) Field of Classification Search
USPC .................. 524/495, 186, 284, 496
See application file for complete search history.

(56) References Cited

U.S. PATENT DOCUMENTS

| | | | |
|---|---|---|---|
| 4,358,552 A | 11/1982 | Shinohara et al. | |
| 6,001,902 A | 12/1999 | Beisele | |
| 7,060,737 B2 | 6/2006 | Yamaguchi et al. | |
| 2007/0066741 A1* | 3/2007 | Donovan et al. | 524/430 |
| 2008/0029917 A1* | 2/2008 | Maldas et al. | 264/40.1 |
| 2008/0148650 A1* | 6/2008 | You | 51/298 |
| 2008/0211142 A1 | 9/2008 | Hollstein | |

FOREIGN PATENT DOCUMENTS

| | | |
|---|---|---|
| CN | 1514859 | 7/2004 |
| CN | 101277992 | 10/2008 |
| JP | H03247652 | 11/1991 |
| JP | 2002275358 | 9/2002 |
| JP | 2005082760 | 3/2005 |
| JP | 2005105159 | 4/2005 |
| JP | 2007177150 | 7/2007 |
| JP | 2007238769 | 9/2007 |
| WO | 99/41306 | 8/1999 |
| WO | WO 00/43431 * | 7/2000 |
| WO | 02/40577 | 5/2002 |
| WO | 03072646 | 9/2003 |
| WO | 2004065469 | 8/2004 |

OTHER PUBLICATIONS

Machine translation of JP 2005-105159. Apr. 2005.*
Machine translation of JP 2002-275358. Sep. 2002.*
English translation of JP 2002-275358. Sep. 2002.*
International Search Report from related PCT Application PCT/CN2009/000423, dated Jan. 28, 2010, 5 pages.
Cherevatskii, et al. "Wollastonite—an effective filler of epoxy polymers", USSR, Plasticheskie Massy, No. 5, 1982, 3 pages.

* cited by examiner

*Primary Examiner* — John Uselding
(74) *Attorney, Agent, or Firm* — Brooks, Cameron & Huebsch, PLLC

(57) ABSTRACT

A thermosettable composition including: (a) at least one thermosetting resin; (b) at least one curing agent for the at least one thermosetting resin; (c) at least one high aspect ratio filler; wherein the aspect ratio of the filler is higher than 5:1; and (d) optionally, at least one catalyst for polymerization, including homopolymerization, of the at least one thermosetting resin; or optionally, at least one catalyst for a reaction between the at least one thermosetting resin and the at least one curing agent.

11 Claims, No Drawings

ANISOTROPIC COMPOSITE

This application is a National Stage application under 35 U.S.C. 371 of PCT/CN2009/000423, filed on Apr. 21, 2009 and published as WO 2010/121393 A1 on Oct. 28, 2010. Priority is claimed to the International Application PCT/CN2009/000423 filed on Apr. 21, 2009, the entire contents of which are incorporated herein by reference.

BACKGROUND OF THE INVENTION

1. Field of the Invention

The present invention relates to a thermosettable composition useful for preparing an anisotropic composite wherein the composition includes a thermosetting resin, a hardener, a filler having an aspect ratio higher than 5:1, and optionally, a catalyst; and a thermoset anisotropic composite product made from the thermosettable composition. The anisotropic composites made from the thermosettable compositions of the present invention may have improved mechanical and thermo-mechanical properties via orientation of the high aspect ratio fillers.

The thermosettable compositions of the present invention are useful in various applications such as casting, potting, and encapsulation, such as electrical and electronics applications, and composites.

2. Description of Background and Related Art

Epoxy systems containing fillers usually afford isotropic properties to the resulting thermoset composition and a degradation of some physical performance when such fillers are used in such thermosettable formulations. Anisotropy is an unusual phenomenon in some thermoset products such as epoxy composites. The property of being "anisotropic" in chemistry is a property of a substance that depends on direction; and is the property of being directionally dependent, as opposed to isotropy, which means homogeneity in all directions.

"Anisotropy" herein is defined as a difference in a physical property, including properties such as thermo-mechanical, coefficient of thermal expansion (CTE), mechanical properties and other properties, for a material when such material is measured along different axes.

It would be desirable in the industry to achieve anisotropic thermo-mechanical properties of thermoset composites filled with inorganic fillers, particularly when the thermoset matrix resin is an epoxy resin. Anisotropic properties of thermoset composites desired to be achieved include, for example, the thermo-mechanical properties, the CTE and the mechanical properties of the composite.

The prior art discloses several known composites having fillers incorporated into the composite. For example, WO 2002040577 teaches the coupling of reinforcing fibers to resins in curable composites.

WO 99-US1380 19990121 discloses filled compositions of syndiotactic monovinylidene aromatic polymer for molded articles having good mechanical properties, surface smoothness and heat aging stability.

JP 03247652 A discloses polyester compositions with good mechanical strength and heat resistance.

Cherevatskii, A. M.; Khozin, V. G.; Voskresenskii, V. A.; Shepelev, Yu. F. USSR. Plasticheskie Massy (1982), (5), 47-8, discloses wollastonite as an effective filler of epoxy polymers.

WO 2006-EP64291 20060714 discloses highly filled epoxy resin casting and potting compositions.

WO 2004065469 A1 20040805 discloses a highly loaded casting resin system containing fillers with multimodal particle size distribution.

WO 2003072646 A1 20030904 teaches highly loaded cast resin systems containing fillers of multimodal particle size distribution.

JP 2005082760 A 20050331 discloses poly(phenylene sulfide) resin compositions for precision moldings with less mechanical anisotropy and dimensional precision.

The compositions described in the above prior art relate to a highly filled system, normally having from 40%-60% filler (see, for example, WO 2003072646; WO 200406546; and WO 2007012577). The known compositions of a highly filled system are described as being useful as a composition for electrical casting. The filler shape of high aspect ratio and the anisotropic thermo-mechanical property and tensile strength are not described. A processing method to achieve anisotropic composite material properties is also not described in the above prior art.

U.S. Pat. No. 4,358,552 teaches epoxy resin molding compositions having low coefficient of thermal expansion and high, thermal conductivity. U.S. Pat. No. 4,358,552 describes a composite made of 40%-80% fillers, including the anisotropic filler like wollastonite. The CTE property is described, however, the improved tensile strength resulting from the orientated distribution of high aspect ratio filler is not described. The prior art document contains very high levels of filler, and the expected viscosity increase would prohibit the compounds use in casting applications. Also the prior art compositions are not expected to afford anisotropic behavior due to the very high filler loadings. Moreover, the processing method of the anisotropic composite is not described, and there is no disclosure of the composition being used in a casting application.

U.S. Pat. No. 6,001,902 discloses a wollastonite-containing curable epoxy resin. U.S. Pat. No. 6,001,902 describes a composition of epoxy resin and wollastonite as inorganic filler used for electrical casting and encapsulation. U.S. Pat. No. 6,001,902 discloses a loading of wollastonite above 50%, but does not describe the wollastonite shape and aspect ratio. The preferred orientation of wollastonite in the composite and the resulting anisotropic thermo-mechanical properties are also not described. The processing method of anisotropic composite is not described.

While the use of fillers in a polymeric system is known, composites having anisotropic properties obtained from casting using very high aspect ratio (>1:20) fillers is not reported in the prior art. More specifically, it is now known to use high aspect ratio fillers at relatively low concentrations to achieve properties, such as rigidity and CTE properties of polymeric matrices, comparable to low aspect ratio fillers at higher concentrations. Consequently, there is a need in the industry to develop a thermosettable composition that will provide a composite with a balance of properties such as viscosity/thermo-mechanical properties. In addition, there is a need in the industry to provide a thermosettable composition which can be used to prepare a composite material having anisotropic properties; and to provide a process for making such composite.

SUMMARY OF THE INVENTION

One aspect of the present invention is directed to a thermosettable composition including: (a) at least one thermosetting resin; (b) at least one curing agent for the at least one thermosetting resin; (c) at least one high aspect ratio filler; wherein the aspect ratio of the filler is higher than 5:1; and (d)

optionally, at least one catalyst for polymerization, including homopolymerization, of the at least one thermosetting resin; or optionally, at least one catalyst for a reaction between the at least one thermosetting resin and the at least one curing agent.

Another aspect of the present invention is directed to an anisotropic composite obtained by curing the above thermosettable resin composition.

Another aspect of the present invention is a process for processing the composite of the present invention with a high aspect ratio filler wherein the composite has anisotropic properties.

Some of the advantages of the present invention over the prior art technologies include for example: (1) the CTE property of the present composition is improved making the composition suitable for some end uses such as electrical casting applications; (2) the use of a high aspect ratio filler, such as wollastonite, affords the composition with improved tensile stress; (3) the use of a high aspect ratio filler, affords the composition with an anisotropic thermo-mechanical property, along different dimensions, resulting from the orientation of the fillers; wherein a very low CTE is achieved along the filler orientation direction; (4) the use of a high aspect ratio filler may significantly reduce the level of filler required to achieve the desired tensile properties; (5) the use of lower levels of a high aspect ratio filler may afford the composition with a significantly reduced viscosity because of the reduced filler levels (relative to other fillers such as silica filler); (6) the lower viscosity composition affords anisotropic properties which may be useful for novel properties, and possibly reliability of laminates; and (7) the use of a high aspect ratio filler in the thermosettable composition of the present invention may enable the use of thin wall molds for casting the thermosettable composition.

DETAILED DESCRIPTION OF THE INVENTION

In the following detailed description, the specific embodiments of the present invention are described in connection with its preferred embodiments. However, to the extent that the following description is specific to a particular embodiment or a particular use of the present techniques, it is intended to be illustrative only and merely provides a concise description of the exemplary embodiments. Accordingly, the present invention is not limited to the specific embodiments. described below, but rather; the present invention includes all alternatives, modifications, and equivalents falling within the true scope of the appended claims.

Unless other wise stated, a reference to a compound or a component includes the compound or component by itself, as well as in combination with other compounds or components, such as mixtures or combinations of compounds.

As used herein, the singular forms "a," "an," and "the" include the plural reference unless the context clearly dictates otherwise.

In its broadest scope, the present invention provides a thermosettable formulation comprising (a) at least a thermosetting resin, (b) at least a curing agent for the thermosetting resin, (c) at least a high aspect ratio filler material, and (d) optionally, at least a catalyst for the reaction between the thermosetting resin and the curing agent.

The thermosetting resin component (a), of the present invention may be selected from known thermosetting resins in the art including at least one resin selected from epoxy resins; isocyanate resins; (meth)acrylic resins; phenolic resins; vinylic resins; styrenic resins; polyester resins; melamine resins; vinylester resins; silicone resins; and mixtures thereof.

In one preferred embodiment, the thermosetting resin useful in the present invention includes at least one epoxy resin, component (a). The term "epoxy resin" herein means a compound which possesses one or more vicinal epoxy groups per molecule, i.e., at least one 1,2-epoxy group per molecule. In general, the epoxy resin compound may be a saturated or unsaturated aliphatic, cycloaliphatic, aromatic or heterocyclic compound which possesses at least one 1,2-epoxy group. Such compounds can be substituted, if desired, with one or more non-interfering substituents, such as halogen atoms, hydroxy groups, ether radicals, lower alkyls and the like. The epoxy resin compound may also be monomeric, oligomeric or polymeric, i.e., the epoxy resin may be selected from a monoepoxide, a diepoxide, a multi-functional epoxy resin, a polyepoxide; or mixtures thereof. An extensive enumeration of epoxy resins useful in the present invention is found in Lee, H. and Neville, K., "Handbook of Epoxy Resins," McGraw-Hill Book Company, New York, 1967, Chapter 2, pages 257-307; incorporated herein by reference.

The epoxy resins useful in the present invention may vary and include conventional and commercially available epoxy resins, which may be used alone or in combinations of two or more. In choosing epoxy resins for compositions disclosed herein, consideration should not only be given to properties of the final product, but also to viscosity and other properties that may influence the processing of the resin composition.

Particularly suitable epoxy resins known to the skilled worker are based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy resins known to the skilled worker include reaction products of epichlorohydrin with o-cresol and, respectively, phenol novolacs. It is also possible to use a mixture of two or more of any of the above epoxy resins.

The epoxy resins, component (a), useful in the present invention for the preparation of the curable compositions, may be selected from commercially available products. For example, D.E.R. 331, D.E.R.332, D.E.R. 334, D.E.R. 580, D.E.N. 431, D.E.N. 438, D.E.R. 736, or D.E.R. 732 available. from The Dow Chemical Company may be used. As an illustration of the present invention, the epoxy resin component (a) may be a liquid epoxy resin, D.E.R.® 383 (DGEBPA) having an epoxide equivalent weight of 175-185, a viscosity of 9.5 Pa-s and a density of 1.16 gms/cc. Other commercial epoxy resins that can be used for the epoxy resin component can be D.E.R. 330, D.E.R. 354, or D.E.R. 332.

Other suitable epoxy resins useful as component (a) are disclosed in, for example, U.S. Pat. Nos. 3,018,262.7,163, 973, 6,887,574, 6,632,893, 6,242,083, 7,037,958, 6,572,971, 6,153,719, and 5,405,688, PCT Publication WO 2006/052727; U.S. Patent Application Publication Nos. 20060293172 and 20050171237, each of which is hereby incorporated herein by reference.

The thermosetting resin, component (a), may be present in the thermosetting composition at a concentration ranging generally from about 10 weight percent (wt %) to about 95 wt %, preferably from about 20 wt % to about 90 wt %, and more preferably from about 30 wt % to about 80 wt %.

The thermosettable resin composition of the present invention may further comprise at least one curing agent, component (b). The curing agent, (also referred to as a hardener or cross-linking agent) may be selected, for example, from those curing agents well known in the art including, but are not limited to, anhydrides, carboxylic acids, amine compounds, phenolic compounds, polyols, or mixtures thereof.

As an illustration of one embodiment wherein the thermosetting resin comprises an epoxy resin, at least one curing agent may be selected from amines, phenolic resins, carboxylic acids, carboxylic anhydrides, or mixtures thereof.

As an illustration of one embodiment wherein the thermosetting resin comprises an isocyanate, the at least one curing agent may be selected from at least one polyol.

Examples of the curing agent useful in the present invention include any of the curing materials known to be useful for curing epoxy resin based compositions. Such materials include, for example, polyamine, polyamide, polyaminoamide, dicyandiamide, polyphenol, polymeric thiol, polycarboxylic acid and anhydride, polyol, tertiary amine, quaternary ammonium halide, and any combination thereof or the like. Other specific examples of the curing agent include dicyandiamide, phenol novolacs, bisphenol-A novolacs, phenol novolac of dicyclopentadiene, diphenylsulfone, styrene-maleic acid anhydride (SMA) copolymers; and any combination thereof.

Dicyandiamide ("dicy") may be one preferred embodiment of the curing agent useful in the present invention. Dicy has the advantage of providing delayed curing since dicy requires relatively high temperatures for activating its curing properties; and thus, dicy can be added to an epoxy resin and stored at room temperature (about 25° C.).

The curing agent, component (b), is present in the thermosettable composition at a concentration ranging generally from about 1 wt % to about 90 wt %, preferably from about 2 wt % to about 80 wt %, more preferably from about 5 wt % to about 60 wt %, and most preferably from about 10 wt % to about 50 wt %.

An important component used in the thermosettable composition of the present invention is the high aspect ratio filler, component (c), such as wollastonite. The high aspect ratio filler that is used in the composite exhibits anisotropic properties according to microscopy observation; and provides improved thermo-mechanical properties to the resultant composite. Accordingly, the present invention composition comprises at least one high aspect ratio filler, component (c).

The term "high aspect ratio" herein means an aspect ratio of greater than 5:1. In general, the high aspect ratio filler has an aspect ratio higher than 5:1, preferably higher than 10:1, more preferably higher than 15:1, and even more preferably higher than 20:1; and has an aspect ratio lower than 1000:1, preferably lower than 100:1, and more preferably lower than 50:1. For an aspect ratio below 5:1, there may be a lack of anisotropic property for the resulting composite, and thus, there may be a lack of enhanced performance along certain directions of the resulting composite. The properties of the composite may be similar to those of the common low aspect ratio filled composite. If the aspect ratio of the filler is higher than 1000:1, no further economical benefit of the anisotropic property may be expected.

In one embodiment, component (c) of the present invention may be any kind of natural filler or synthetic filler with an aspect ratio higher than 5:1, preferably higher than 10:1, more preferably higher than 15:1, and even more preferably higher than 20:1. In one embodiment, the aspect ratio may be from about 5:1 to about 20:1.

An example of a natural inorganic high aspect ratio filler material includes wollastonite. An example of a synthetic inorganic high aspect ratio filler material includes carbon nanotubes. Alternative natural fillers having a high aspect ratio may be used including for example, but not limited to, asbestos, mica, boehmite, needle-like organo-clays, platelet-like organo-clays, lamellas, phyllosilicates, hydrotalcites, wiskers, sepiolite, layered silicates, cloisite, and mixtures thereof. Alternative synthetic fillers having a high aspect ratio, ratio may be used including for example, but not limited to, clays; oxides such as saponite, hectorite, mixed layered hydroxides; vermiculite; zeolites such as mordenite; and silicates such as kanemite, octasilicate, magadiite, and kenyaite; and mixtures thereof. Examples of synthetic (or natural) fillers include platelets and sheets such as montmorillonite, saponites, micas, vermiculite, kaolin, talc, metal hydroxides, graphite, and mixtures thereof. Examples of synthetic (or natural) fillers include fibers, laths, rods such as hectorites, attapulgite, sepiolites, graphite, phosphates derivatives, and mixtures thereof. An inorganic filler preferably used in the present invention may be wollastonite. The surface of the fillers can be modified with suitable compounds such as ion-exchange compounds; coupling agents such as silane, titanate, and zirconate; amines; quaternary cations; and mixtures thereof.

Component (c) is present in the thermosetting composition at a concentration ranging generally from about 1 wt % to about 95 wt %, based on the total weight of the composition, preferably between about 2% and about 60%, more preferably between about 3% and about 40%, even more preferably between about 5 wt % to about 30 wt %, and more preferably from about 10 wt % to about 20 wt %. If the concentration of component (c) is used above 95 wt %, the processability of the composition may be extremely poor to make the composite at standard processing conditions. If the concentration of component (c) is used below *1 wt %, the reinforcement and anisotropic effects may be too limited to be observed.

In one embodiment, a filler composition of 20 weight percent to 40 weight percent is used. Compared with high filler concentrations, this medium filler concentration range has an advantage in that the filler can be mixed with known epoxy resins having typical viscosities and not special epoxy resins made with a special low viscosity. In addition, the processing of the thermosettable composition of the present invention can be conducted at typical working conditions. Furthermore, the final properties of the resulting material, particularly in certain directions, can match those of composites filled with low aspect ratio fillers at high filler concentrations.

Using the high aspect ratio fillers in the thermosettable composition of the present invention, provides anisotropic properties to the resulting composite. The thermo-mechanical property is anisotropic due to the self-formed orientation of high aspect ratio fillers. The thermo-mechanical properties, such as the coefficient of thermal expansion (CTE), the heat transfer, the dielectric properties, the toughness, the modulus, the elongation at yield or at break, and the strength, are largely different along and across the filler orientations. The relative difference of properties along and across the filler orientation is at least about 5%, preferably at least about 10%, more preferably at least about 20%, and most preferably at least about 30%.

For example, the coefficient of thermal expansion below Tg, CTE (alpha-1), along the orientation of the filler is less than about 70 ppm/K, preferably less than about 65 ppm/K, more preferably less than about 60 ppm/K, and most preferably less than about 55 ppm/K for a concentration of filler of 20% by weight. For example, the coefficient of thermal expansion above Tg, CTE (alpha-2), along the orientation of the filler is less than about 200 ppm/K, preferably less than about 180 ppm/K, more preferably less than about 150 ppm/K, and most preferably less than about 130 ppm/K for a concentration of filler of about 20% by weight. As can be seen in the Examples and the results in Tables II and IV which follow, a small CTE along the orientation of the fillers was found. For example, in an unfilled system the CTE 50-160° C. is 118 ppm; and in a system filled with about 20 wt % silica with a low aspect ratio, the CTE is 97. The CTE of a filled system with about 20 wt % wollastonite along the filler direction is below 80 which is comparable to a CTE of a 60 wt % silica filled system.

In another embodiment, the tensile strength along the orientation of the filler is higher than about 70 MPa for a concentration of filler of about 20% by weight.

An object of the present invention is to achieve anisotropic thermo-mechanical properties of thermoset resins filled with high aspect ratio inorganic fillers. For example, the thermoset matrix resin may be an epoxy resin. The anisotropic properties of the thermoset composite may include thermo-mechanical properties, CTE and mechanical properties.

As an illustration of the present invention, a composite material that has anisotropic properties comprises a resin as a matrix and an inorganic filler as a reinforcement. The matrix resin, is a thermoset resin, for example an epoxy resin formulation. The inorganic filler is in micro-meter scale and is of high aspect ratio. Generally, the aspect ratio is larger than about 5, and preferably larger than about 10. The inorganic filler is preferably a wollastonite. The total amount of inorganic filler in the formulation is from about 2 wt % to about 40 wt %. The high aspect ratio filler forms a preferred orientation in the resin matrix and have the anisotropic property after curing. The CTE along filler orientation is lower than low aspect ratio filled composite of same load and size. The tensile strength along the filler orientation is higher than low aspect ratio filled composite of same load and size. The preparation of this anisotropic composite is made by casting the resin and filler mixture into a mold. One dimension of the mold is much smaller than other two dimensions. The dimension ratio of larger to small is larger than about 10:1 and preferably about 50:1.

Optional component (d) useful in the thermosettable composition of the present invention includes at least one catalyst. The catalyst used in the present invention may be adapted for polymerization, including homopolymerization, of the at least one thermosetting resin. Alternatively, catalyst used in the present invention may be adapted for a reaction between the at least one thermosetting resin and the at least one curing agent.

The catalyst, component (d), useful in the present invention may include catalysts well known in the art, such as for example; catalyst compounds containing amine, phosphine, heterocyclic nitrogen, ammonium, phosphonium, arsonium, sulfonium moieties, and any combination thereof. Some non-limiting examples of the catalyst, component (d), of the present invention may include, for example, ethyltriphenylphosphonium; benzyltrimethylammonium chloride; heterocyclic nitrogen-containing catalysts described in U.S. Pat. No. 4,925,901, incorporated herein by reference; imidazoles; triethylamine; and any combination thereof.

The concentration of the catalyst (d) present in the thermosetting composition ranges generally from about 0.1 wt % to about 1 wt %, preferably from about 0.2 wt % to about 0.8 wt %, and more preferably from about 0.4 wt % to about 0.6 wt % based on the total organic compounds in the composition. Above the about 1 wt % range, the reaction may be too fast leading possibly to poor processability; and thus, the formulation may not be processed under conventional processing conditions. Below the about 0.1 wt % range, the reaction may be too slow prolonging the curing time; and thus, the formulation may not be processed under conventional processing conditions.

The thermosettable composition of the present invention may optionally further comprise at least a second reactive resin different from the epoxy resin (a) and different from the curing agent (c). For example, the composition may include a combination of a first reactive thermosetting resin and a second reactive thermosetting resin. The second reactive resin useful in the present invention may form a part of the cross-linked network. Examples of such resins include isocyanate resins, (meth)acrylic resins, phenolic resins, melamine resins, vinylic resins, vinylester resins, styrenic resins, silicone resins, polyester resins and mixtures thereof.

The thermosettable composition of the present invention may optionally further comprise at least a second curing agent or co-curing agent. The co-curing agent, different from the curing agent (c) may be selected from, but are not limited to, amines, phenolic resins, carboxylic acids, and polyol resins. In embodiments wherein the reactive resin comprises an isocyanate, at least one curing agent may be selected from polyols.

The concentration of the additional reactive resin, if used, is generally between about 0.5 percent by weight (wt %) to about 50 wt %, preferably between about 1 wt % to about 40 wt %, more preferably between about 2 wt % to about 30 wt %, and most preferably between about 5 wt % to about 25 wt % based on the weight of the total organic compounds. Above 50 wt %, the additional reactive resin becomes the main resin. Below 0.5 wt %, the concentration is not large enough to make a difference in properties.

The thermosettable composition of the present invention may optionally further comprise at least one solvent. The solvents useful in the present invention may include for example ketones, alcohols, water, glycol ethers, aromatic hydrocarbons and mixtures thereof. The solvent may include, for example, acetone, methyl ethyl ketone, methyl isobutyl ketone, cyclohexanone, methylpyrrolidinone, propylene glycol monomethyl ether, propylene glycol monomethyl ether acetate, ethylene glycol monomethyl ether, methyl amyl ketone, methanol, isopropanol, toluene, xylene, dimethylformamide (DMF) and mixtures thereof. A single solvent may be used, but also separate solvents may be used for one or more components. Suitable solvents for the epoxy resins and curing agents may be ketones, including acetone, methylethyl ketone and the like, and ether alcohols such as methyl, ethyl, propyl or butyl ethers of ethylene glycol, diethylene glycol, propylene glycol or dipropylene glycol, ethylene glycol monomethyl ether, or 1-methoxy-2-propanol, and the respective acetates. Embodiments of the solvent for the catalyst of the present invention include alcohols, ketones, water, dimethylformamide (DMF), glycol ethers such as propylene glycol monomethyl ether or ethylene glycol monomethyl ether, and combinations thereof.

The concentration of the solvent is generally between 0 wt % to about 80 wt %, preferably between about 1 wt % to about 60 wt %, more preferably between about 2 wt % to about 50 wt %, and most preferably between about 5 wt % to about 40 wt % based on the weight of the total organic compounds.

The thermosettable composition of the present invention may optionally comprise an inhibitor additive such as a Lewis acid. Examples of the Lewis acids useful for the present invention include halides, oxides, hydroxides, and alkoxides of zinc, tin, titanium, cobalt, manganese, iron, silicon, aluminum, boron, other Lewis acids that tend to have a relatively weak conjugate base such as boric acid, and any mixture thereof More specific examples include Lewis acids of boron and anhydrides of Lewis acids of boron. Preferred examples of Lewis acids of boron include boric acid, metaboric acid, substituted boroxines (such as trimethoxyboroxine, triethyl boroxine), substituted oxides of boron, alkyl borates, and any mixture thereof.

The Lewis acid may form a mixture with the amine catalyst including any amine-containing compound stated above. The Lewis acid and amines catalyst mixture can be combined before mixing into the thermosettable composition or mixed with the amines catalyst in-situ to make a curing catalyst combination.

The thermosettable composition of the present invention may optionally contain one or more other additives which are useful for their intended uses. For example, the optional additives useful in the present invention composition may include, but not limited to, stabilizers, surfactants, flow modifiers, pigments or dyes, matting agents, degassing agents, flame retardants, toughening agents, curing initiators, curing inhibitors, wetting agents, colorants or pigments, thermoplastics, processing aids, UV blocking compounds, fluorescent compounds, UV stabilizers, inert fillers other than the high aspect ratio fillers of the present invention, antioxidants, impact modifiers including thermoplastic particles, and mixtures thereof. The above list is intended to be exemplary and not limiting. The preferred additives for the, formulation of the present invention may be optimized by the skilled artisan.

The concentration of the additional additives is generally between 0 wt % to about 50 wt %, preferably between about 0.01 wt % to about 20 wt %, more preferably between about 0.05 wt % to about 15 wt %, and most preferably between about 0.1 wt % to about 10 wt % based on the weight of the total composition. Below about 0.01 wt %, the additives generally do not provide any further significant advantage to the resultant thermoset product; and above about 20 wt %, the properties improvement brought by these additives remains relatively constant.

The components of the formulation or composition of the present invention may be admixed in any order to provide the thermosettable composition of the present invention. The formulation of the present invention composition can be cured under conventional processing conditions to form a thermoset. The resulting thermoset displays excellent thermo-mechanical properties, such as good toughness and mechanical strength, while maintaining high thermal stability.

All the components of the thermosettable epoxy resin composition are typically mixed and dispersed at a temperature enabling a low viscosity for the effective mixing of the components. The temperature during the mixing of all components may be at ambient temperature, or from about 20° C. to about 90° C., and more preferably from 50° C. to 80° C. The volatile by-products can be removed by vacuum degassing of the curing agent or of the formulated mixture of curing agent. Above the temperature of about 90° C., the crosslinking reaction may prematurely start during the mixing of components, and below the temperature of 20° C., the viscosity of the composition may be too high to thoroughly and homogeneously mix the components together.

When degassing is performed at elevated temperature (i.e. higher than about 50° C.), it is preferred to degas the curing agent before the addition of the epoxy resin to avoid reaction between epoxy and curing agent during the process. Degassing is recommended when bulk and thick products are prepared.

The process to produce the thermoset products of the present invention may be performed by gravity casting, vacuum casting, automatic pressure gelation (APG), vacuum pressure gelation (VPG), infusion, filament winding, lay up injection, transfer molding, prepreging, dipping, coating, spraying, brushing, and the like.

The curing of the thermosettable composition may be carried out for a predetermined period of time and a predetermined temperature sufficient to cure the composition. For example, the curing temperature may be from about 0° C. to about 250° C., preferably from about 20° C. to about 180° C., and more preferably from about 25° C. to about 160° C. The curing time may be chosen between about 1 minute to about 96 hours, preferably between about 5 minutes to about 48 hours, and more preferably between about 10 minutes to about 24 hours. Below a period of time of 1 minute, the time may be too short to ensure sufficient reaction under conventional processing conditions; and above 96 hours, the time is too long to be practical or economical.

In one embodiment, the anisotropic composite of the present invention may be made by casting the resin/filler composition into a mold. More preferably, the formulation is de-gassed before casting in the mold. The mold preferably has one dimension scale much smaller than the other two dimensions. The ratio of the large dimension to the small dimension of the mold may be about 10:1, preferably about 20:1, and more preferably about 50:1. The filler is added into the resin formulation and forms an even distribution by dispersion.

One embodiment of the anisotropic composite is based on casting an epoxy resin matrix and a high aspect ratio inorganic material as a filler, such as wollastonite. The preferred orientation of the high aspect ratio inorganic filler leads to anisotropic thermo-mechanical properties and mechanical properties of the composite. More specifically, along the direction of filler orientation, the CTE and tensile strength properties are better than other directions and are also better than other resin systems with the same load of a low aspect ratio inorganic filler, such as silica.

After the composition of the present invention is cast into a mold and ejected from the mold, the composite may be further processed via machining or grinding. The molded article may be painted or glued or adhered.

The properties of the composite product of the present invention include for example an anisotropic thermo-mechanical property, E. The thermo-mechanical property may vary depending on various factors such as the amount of filler. For example, when a 20 wt % of filler is used, the Young modulus at 25° C. in the preferred orientation of fillers is between about 2 GPa and about 200 GPa, preferably between about 3 GPa and about 100 GPa, more preferably between about 4 GPa and about 50 GPa (E'g 4-4.5 GPa, E'r 80-100 MPa).

The thermo-mechanical properties may be improved along different dimensions of the product composite. For example, at least one thermo-mechanical property shows an improvement of at least about 5 percent (%) in a preferred direction, preferably at least about 10% improvement, and more preferably at least about 20% improvement.

The preferred orientation of the fillers is preferably in the longest direction of the filler, i.e., perpendicular to one dimension.

Another advantage of the product composite properties is shown in the composite having a very low CTE. For example, when using 20 wt % of filler in the composition, in the preferred orientation, CTE alpha-1 (below Tg): between about 15 ppm/K and about 80 ppm/K, preferably between about 20 ppm/K and about 60 ppm/K, more preferably between about 25 ppm/K and about 55 ppm/K, and most preferably between about 30 ppm/K and about 50 ppm/K (50-55 ppm) is obtained; and CTE alpha-2 (above Tg): between about 80 ppm/K and about 240 ppm/K, preferably between about 90 ppm/K and about 180 ppm/K, more preferably between about 95 ppm/K and about 160 ppm/K, and most preferably between about 100 ppm/K and about 140 ppm/K (114-118 ppm) is obtained.

Still another benefit seen in the composite product of the present invention may be increased tensile strength. For example, when 20 wt % of filler is used in the composition, in the preferred orientation, the tensile strength may be higher than about 40 MPa, preferably higher than about 50 MPa, more preferably higher than about 60 MPa, and most preferably higher than about 70 MPa when formulated with 20% wt of silica fillers. The thermoset product of the present invention shows a tensile strength lower than about 500 MPa, preferably lower than 300 MPa, more preferably lower than 200 MPa, and most preferably higher than 150 MPa when formulated with 20% wt of silica fillers. In one embodiment, the thermoset product of the present invention shows a tensile strength of from about 40 MPa to about 500 MPa. In general, the tensile strength is about 70 MPa.

The load of filler used in the composition of the present invention may be from about 2 wt % to about 40 wt %, preferably about 5 wt % to about 30 wt %, and more preferably from about 10 wt % to about 20 wt %. The filler loading is preferably chosen between about 1 wt % to about 95 wt %, based on the total weight of the composition, preferably between about 2 wt % and about 60 wt %, more preferably between about 3 wt % and about 40 wt %, even more preferably between about 5 wt % and about 30 wt %, and even more preferably between about 10 wt % and about 20 wt %.

As an illustration of the present invention, in general, epoxy-type impregnating compositions, may be useful for casting, potting, encapsulation, molding, and tooling. The present invention is particularly suitable for all types of electrical casting, potting, and encapsulation applications; for molding and plastic tooling; and for the fabrication of epoxy based composites parts, particularly for producing large epoxy-based parts produced by casting, potting and encapsulation. The resulting composite material exhibiting anisotropic property may be useful in some applications, such as electrical casting applications or electronic encapsulations, castings, moldings, potting, encapsulations, injection, resin transfer moldings, composites, coatings, that require an outstanding performance along a certain direction.

EXAMPLES

The following examples and comparative examples further illustrate the present invention in detail but are not to be construed to limit the scope thereof.

Various terms, abbreviations and designations for the raw materials used in the following Examples are explained as follows:

Epoxy Resin ER1 is a diglycidyl ether of bisphenol A. This epoxy resin does not contain volatile organic compounds. The EEW of this resin is 180. The viscosity of this resin at 25° C. is about 10020 mPa.s.

Anhydride curing agent AH1 is methyl tetrahydrophthalic anhydride (MTHPA).

The initiator used in the Examples is diethylene glycol (DEG); and the catalyst used in the examples is 1-benzyl-2-phenyl imidazole (1B2PZ).

A high aspect ratio filler used in the Examples is wollastonite with an epoxy silane surface treatment. The average length of this filler is 80 μm, and the width of this filler is 5 μm. The aspect ratio of this filler is 16:1.

A moderate aspect ratio filler used in the Examples is wollastonite with an epoxy silane surface treatment. The average length of this filler is 20 μm, and the width of this filler is 5 μm. The aspect ratio of this filler is 4:1.

A low aspect ratio filler used in the Examples is crystalline silica with an epoxy silane surface treatment. The medium grain size ($D_{50}$) of this filler is 4 μm.

The following standard analytical equipments and methods are used in the Examples:

General Preparation of Clear Casting

Individual resins compositions (including an epoxy and a curing agent) are blended with a filler at ambient temperature (about 25° C.), until a homogenous blend is obtained. A high-speed disperser at 2000 rpm for 20 minutes is used to disperse the filler into the resin part). The epoxy and curing agent resins containing filler, are then mixed together using the disperser to prepare the formulations. An initiator and a catalyst are optionally added to the resin part and curing agent part respectively. Degassing of the formulation is optional but preferably conducted at vacuum to release any air trapped in the formulation during dispersion.

Castings are prepared by pouring the formulation into an open mold (the mold is a 250 mm*250 mm*4mm square mold). Castings are cured by heating in an oven using a step curing process of 100° C. for 2 hours, followed by 120° C. for 1 hour, followed by 140° C. for 1 hour, and then followed by. 160° C. for 1 hour. The castings are then conditioned for about 1 hour prior to de-molding and testing. In other words, after curing the casting at 160° C. for 1 hour, the heater of the oven is turned down. Rather than directly taking out the composite casting sample out of the mold right after cure, the composite is kept in the oven and cooled down gradually from the temperature of 160° C. to room temperature (about 25° C.). This gradual cool down step avoids internal stress build up in the casting.

Measurement of Viscosity

The viscosity of the resin formulations is determined with an ICI cone and plate rheometer (ISO 2884). The formulations are prepared according to the general procedure described above. As soon as the epoxy formulation with fillers are thoroughly mixed, a sample of formulation (about 0.5 g) is taken and placed on a temperature-controlled plate (±0.1° C.) kept at 25° C. Then the cone is lowered and contacted with the formulation. The rotation of the cone is started and the temperature is equilibrated at 25° C. The rotational speed of the cone is adjusted to obtain the best accuracy of measurement, as described in the apparatus operating procedure. The viscosity measurement is taken after less than 4 minutes. The reproducibility of the viscosity measurement method is estimated to be about ±5%.

Measurement of Coefficient of Thermal Expansion (CTE)

The coefficient of thermal expansion is measured by thermal-mechanical analysis (TMA) of TA Instruments according to ISO 11395-2 method. A cured plaque is cut into a test sample with dimensions of 3 mm*3 mm*3 mm. The first scan of the test sample, to determine CTE, is a stress relaxation scan between 30-180° C. at 20° C./minute under $N_2$. The second scan of the test sample is 30-230° C. at 10° C./minute under $N_2$, to determine $CTE_1$(alpha-1), $CTE_1$(alpha-2), $CTE_1$ (50-160) and the third scan is 30-230° C. at 10° C./minute under $N_2$, to determine $CTE_2$(alpha-1), $CTE_2$(alpha-2), $CTE_2$ (50-160). The CTE values in the examples are the average CTE value of $CTE_1$ and $CTE_2$. The reproducibility of the CTE measurement method was estimated to be about ±5%.

Measurement of Tensile Strength

The tensile strength is conducted on an Instron® 5566 according to ISO 527 method. The reproducibility of the tensile strength measurement method is estimated to be about ±5%.

Examples 1 and Comparative Examples A and B

A formulation containing high aspect ratio wollastonite filler (Example 1 of the present invention), a respective formulation containing no filler (Comparative Example A), and a formulation containing a higher concentration of filler (Comparative Example B) than Example 1 were prepared according to the above general preparation of clear castings procedure. The composition of the formulations and the properties of the resultant castings are shown in Tables I and II.

TABLE I

Composition of the Formulations

| Component | Comparative Example A | Example 1 | Comparative Example B |
|---|---|---|---|
| Epoxy Resin ER1 | 259.8 g | 207.9 g | 155.9 g |
| Anhydride Hardener AH1 | 227.7 g | 182.1 g | 136.6 g |
| Initiator | 10 g | 8 g | 6 g |
| Catalyst | 2.5 g | 2 g | 1.5 g |
| Wollastonite (16:1) | 0 g | 100 g | 200 g |

TABLE II

Properties of the Formulations

| | Comparative Example A | Example 1 | Comparative Example B |
|---|---|---|---|
| Filler content | 0% | 20% | 40% |
| Properties before curing | | | |
| Viscosity of the formulation at 25° C. (5 min after mixing) | 560 mPa · s | 980 mPa · s | 8100 mPa · s |
| Properties after curing | | | |
| Tg (ISO 11357-2) | 125° C. | 125° C. | not measured |
| Mechanical properties | isotropic | anisotropic | not measured |
| CTE (alpha-1) | 75 ppm | perpendicular to yz-plane: 52 ppm perpendicular to xy-plane: 53 ppm perpendicular to xz-plane: 80 ppm | not measured |
| CTE (alpha-2) | 200 ppm | perpendicular to yz-plane: 114 ppm perpendicular to xy-plane: 118 ppm perpendicular to xz-plane: 312 ppm | not measured |
| CTE (50-160) | 118 ppm | perpendicular to yz-plane: 77 ppm perpendicular to xy-plane: 79 ppm perpendicular to xz-plane: 171 ppm | not measured |
| Tensile strength | 51 MPa | perpendicular to yz-plane: 69 MPa perpendicular to xy-plane: 68 MPa perpendicular to xz-plane: not measured | not measured |

Example 1 led to significantly improved tensile properties relative to Comparative Example A. Example 1 also led to significant anisotropy in CTE properties. When compared with Comparative Example A, the CTE of the casting of Example 1 was much lower in the directions perpendicular to yz-plane and xy-plane, whereas the CTE was much higher in the direction perpendicular to the xz-plane.

Comparative Example B had a very high viscosity that led to poor casting processability; and thus, no acceptable casting specimen was obtained with the above-mentioned processing conditions. The viscosity builds up of Comparative Example B was quite fast at high filler loads. It was found that the filler load of 40 wt % is difficult to process under normal casting conditions. The filler loading of 20 wt % of Example 1, on the other hand, gives good performance and processability.

Comparative Examples C and D

A formulation similar to Example 1, except that the formulation contains a low aspect ratio silica filler (Comparative Example C) was prepared according to the above general preparation of clear castings procedure. In addition, a formulation containing a high concentration of low aspect ratio silica filler (Comparative Example D) was prepared according to the above general preparation of clear castings procedure. The composition of the formulations and the properties of the castings for Comparative Examples C and D are shown in Tables III and IV.

TABLE III

Composition of the Formulations

| Component | Comparative Example C | Comparative Example D |
|---|---|---|
| Epoxy Resin ER1 | 207.9 g | 103.9 g |
| Anhydride Hardener AH1 | 182.1 g | 91.1 g |
| Initiator | 8 g | 4 g |
| Catalyst | 2 g | 1 g |
| Silica | 100 g | 300 g |

TABLE IV

Properties of the Formulations

| | Comparative Example C | Comparative Example D |
|---|---|---|
| Filler content | 20% | 60% |
| Properties before curing | | |
| Viscosity of the formulation at 25° C. (5 min after mixing) | 940 mPa · s | 4500 mPa · s |
| Properties after curing | | |
| Tg | 125° C. | 125° C. |
| Mechanical properties | isotropic | isotropic |
| CTE (alpha-1) | 66 ppm | 45 ppm |
| CTE (alpha-2) | 184 ppm | 129 ppm |
| CTE (50-160) | 97 ppm | 75 ppm |
| Tensile strength | 61 MPa | 73 MPa |

As shown in the above tables, Comparative Example C has a similar viscosity than that of Example 1. However, Example 1 led to a significant increase in tensile properties relative to Comparative Example C. Example 1 also led to significant anisotropy in CTE properties when compared with Comparative Example C. The CTE of Example 1 was much lower in the directions perpendicular to yz-plane and xy-plane, whereas the CTE was much higher in the direction perpendicular to the xz-plane. This due to the casting of Comparative Example C having 20 wt % of a low aspect ratio filler (silica). It was found that for the same concentration of filler, the CTE of a high aspect ratio filler composite is much lower, which is desired for electrical casting applications, than for a low aspect ratio filler composite.

Comparative Example D had a much higher viscosity than Example 1, leading to poor casting processability. When compared with Comparative Example D, Example 1 led to similar tensile strength and significant anisotropy in CTE properties. When compared with Comparative Example D, the CTE of Example 1 was similar in the directions perpendicular to yz-plane and xy-plane, whereas the CTE was much higher in the direction perpendicular to the xz-plane. This comparison shows that in order to obtain similar low CTE, along certain direction, a low concentration of high aspect ratio silica filler (e.g. 20 wt. %) may be used as compared to about 60 wt % silica. In addition, the viscosity is much lower for Example 1 than Comparative Example D.

Comparative Example E

A similar formulation to Example 1, except that the formulation contained a lower aspect ratio (about 4:1) wollastonite filler (Comparative Example E), was prepared according to the above general preparation of clear castings procedure. The composition of the formulation and the properties of the casting are shown in Tables V and VI.

TABLE V

Composition of the Formulations

| Component | Comparative Example E |
|---|---|
| Epoxy Resin ER1 | 207.9 g |
| Anhydride Hardener AH1 | 182.1 g |
| Initiator | 8 g |
| Catalyst | 2 g |
| Wollastonite (4:1) | 100 g |

TABLE VI

Properties of the Formulations

| | Comparative Example E |
|---|---|
| Filler content | 20% |
| Properties before curing | |
| Viscosity of the formulation at 25° C. (5 min after mixing) | 1030 mPa·s |
| Properties after curing | |
| Tg | 125° C. |
| Mechanical properties | isotropic |
| CTE (alpha-1) | 65 ppm |
| CTE (alpha-2) | 185 ppm |
| CTE (50-160) | 99 ppm |
| Tensile strength | 57 MPa |

When compared with Example 1, the viscosity of Comparative Example E was about the same. Unlike Example 1, Comparative Example E displayed isotropic mechanical properties. The CTE of Example 1 was much lower in the directions perpendicular to yz-plane and xy-plane, whereas the CTE was much higher in the direction perpendicular to the xz-plane. Example 1 led to significantly increased tensile properties relative to the Comparative Example E. Comparative Examples C and E showed similar properties.

It will be obvious to persons skilled in the art that certain changes may be made in the methods described above without departing from the scope of the present invention. It is therefore intended that all matter herein disclosed be interpreted as illustrative only and not as limiting the scope of protection sought. Moreover, the process of the present invention is not to be limited by the specific examples set forth above including the tables to which they refer. Rather, these examples and the tables they refer to are illustrative of the process of the present invention.

What is claimed is:

1. A cured product of a thermosettable composition comprising
    (a) at least one thermosetting resin, where the at least one thermosetting resin is selected from epoxy resins, (meth)acrylic resins, phenolic resins, vinylic resins, styrenic resins, polyester resins, and mixtures thereof and is present in the thermosettable composition at a concentration of about 30 weight percent (wt. %) to about 80 wt. %;
    (b) at least one curing agent for the at least one thermosetting resin, where the at least one curing agent is present in the thermosettable composition at a concentration of about 10 wt. % to about 50 wt. %; and
    (c) a filler of at least one of carbon nanotubes or wollastonite, where the filler is present in the thermosettable composition at a concentration of about 10 wt. % to about 20 wt. % and has an aspect ratio in a range from 35:1 to 1000:1, wherein the thermosettable composition cures to the cured product having a Young's Modulus at 25° C. from about 2 GPa to about 200 GPa.

2. The cured product of the composition of claim 1, including (d) at least one catalyst.

3. The cured product of the composition of claim 2, wherein the at least one catalyst catalyzes the polymerization of the at least one thermosetting resin.

4. The cured product of the composition of claim 2, wherein the at least one catalyst catalyzes the homopolymerization of the at least one thermosetting resin.

5. The cured product of the composition of claim 2, wherein the at least one catalyst catalyzes a reaction between the at least one thermosetting resin and the at least one curing agent.

6. The cured product of the composition of claim 1, wherein the at least one curing agent for the at least one thermosetting resin is selected from amines, phenolic resins, carboxylic acids, carboxylic anhydrides, polyol resins and mixtures thereof.

7. The cured product of the composition of claim 1, wherein the at least one thermosetting resin comprises an epoxy resin; and the at least one curing agent is chosen from amines, phenolic resins, carboxylic acids, and carboxylic anhydrides.

8. The cured product of the composition of claim 1 having a CTE α-1 as determined by thermal-mechanical analysis according to ISO 11395-2 of from about 15 ppm/K to about 80 ppm/K, when using 20 wt % of filler in the composition, in the preferred orientation.

9. The cured product of the composition of claim 1 having a CTE α-2 as determined by thermal-mechanical analysis according to ISO 11395-2 of from about 80 ppm/K to about 240 ppm/K, when using 20 wt % of filler in the composition, in the preferred orientation.

10. The cured product of the composition of claim 1 having a tensile strength of at least about 40 MPa as determined by ISO 527.

11. A thermosettable resin composition comprising
(a) at least one thermosetting resin, where the at least one thermosetting resin is selected from epoxy resins, (meth)acrylic resins, phenolic resins, vinylic resins, styrenic resins, polyester resins, and mixtures thereof and is present in the thermosettable composition at a concentration of about 30 weight percent (wt. %) to about 80 wt. %;
(b) at least one curing agent for the at least one thermosetting resin, where the at least one curing agent is present in the thermosettable composition at a concentration of about 10 wt. % to about 50 wt. %;
(c) a filler of at least one of carbon nanotubes or wollastonite, where the filler is present in the thermosettable composition at a concentration of about 10 wt. % to about 20 wt. % and has an aspect ratio in a range from 35:1 to 1000:1;

wherein the resin composition is capable of being cured to form a cured product having the following properties, when using 20 wt of filler in the composition, in the preferred orientation:
(i) a Young's Modulus E at 25° C. from about 2 GPa to about 200 GPa;
(ii) a CTE α-1 as determined by thermal-mechanical analysis according to ISO 11395-2 of from about 15 ppm/K to about 80 ppm/K;
(iii) a CTE α-2 as determined by thermal-mechanical analysis according to ISO 11395-2 of from about 80 ppm/K to about 240 ppm/K; and
(iv) a tensile strength of at least about 40 MPa as determined according to ISO 527.

* * * * *